Aug. 26, 1947. H. H. CHESNY 2,426,296
APPARATUS FOR REMOVING SOLUBLE IMPURITIES FROM SOLID SUBSTANCES
Original Filed Aug. 4, 1938 3 Sheets-Sheet 1
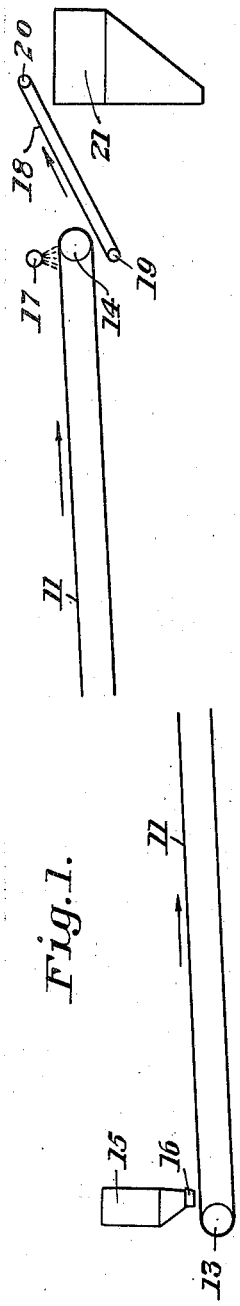
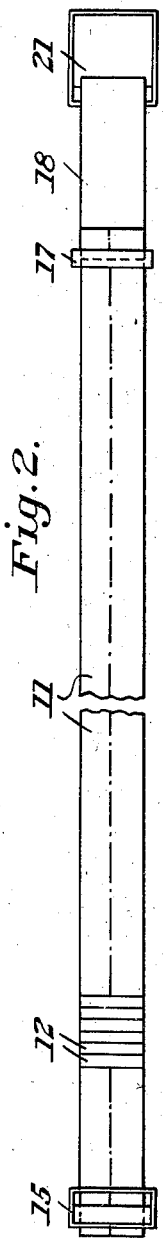
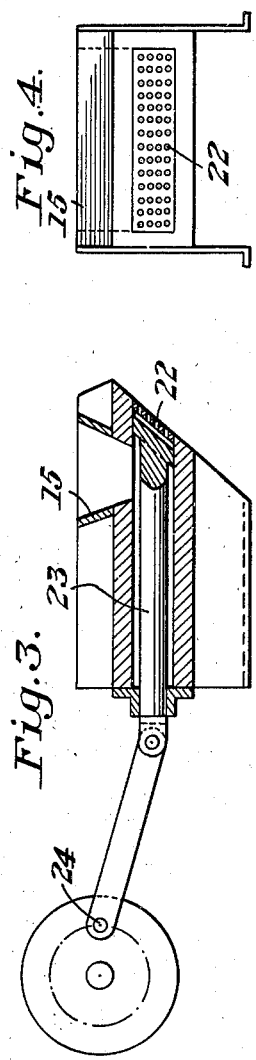
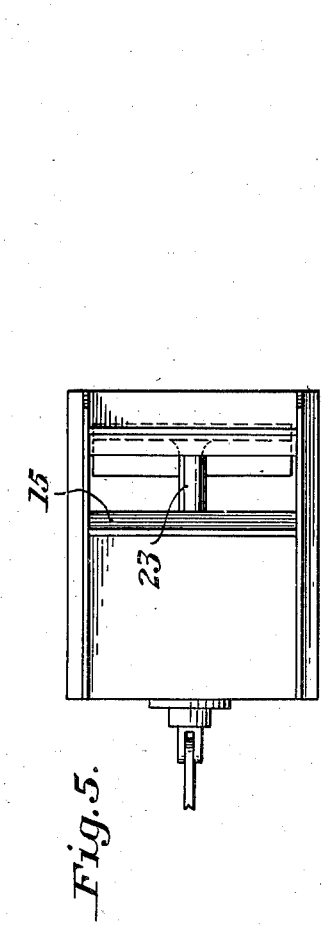
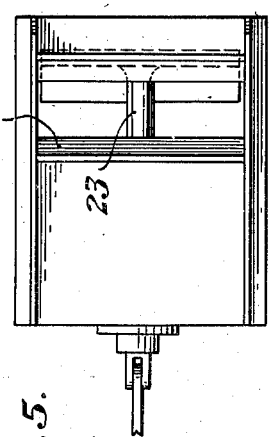
INVENTOR
Heinz Henry Chesny
By Stebbins and Blenko
Attorneys

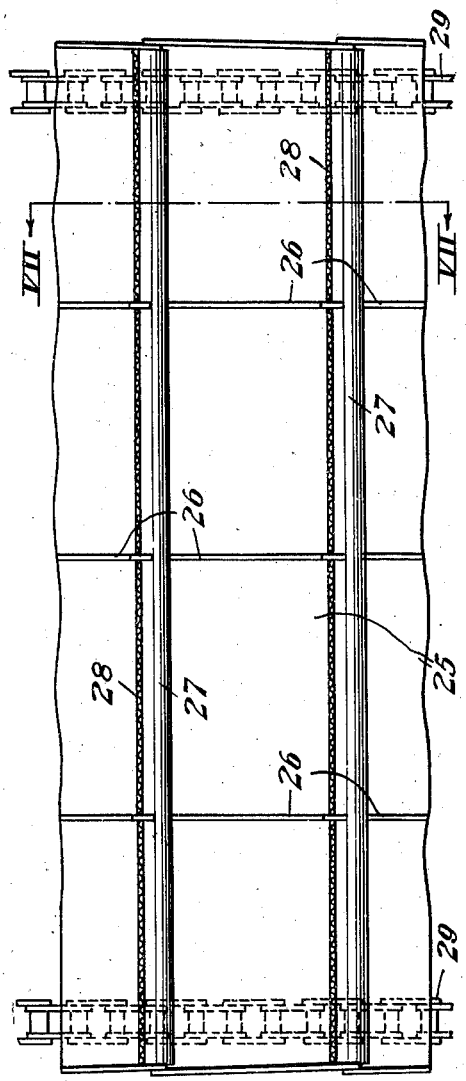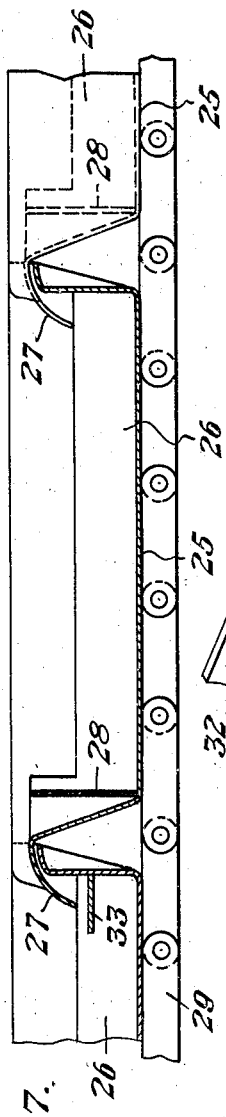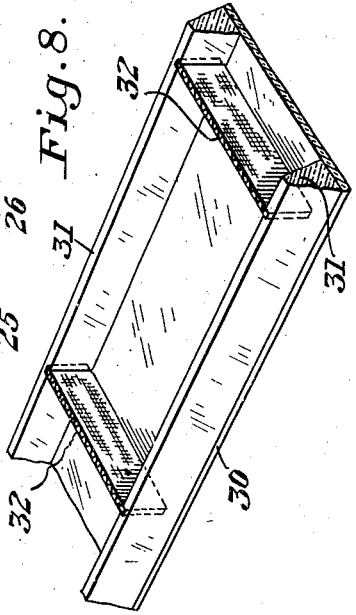

Aug. 26, 1947.  H. H. CHESNY  2,426,296
APPARATUS FOR REMOVING SOLUBLE IMPURITIES FROM SOLID SUBSTANCES
Original Filed Aug. 4, 1938  3 Sheets-Sheet 3
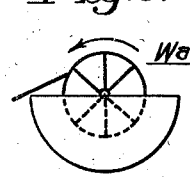
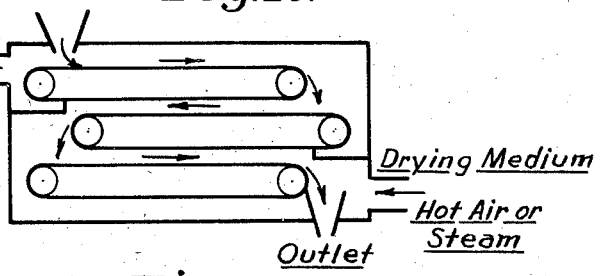
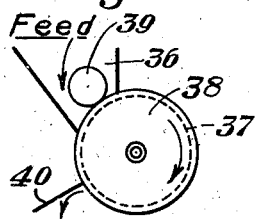
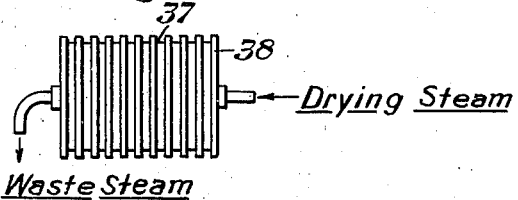
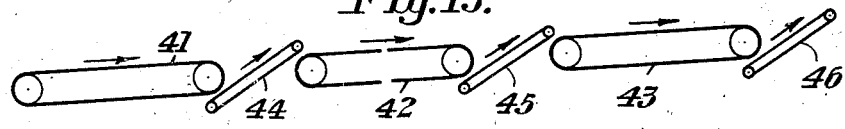
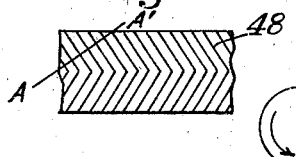
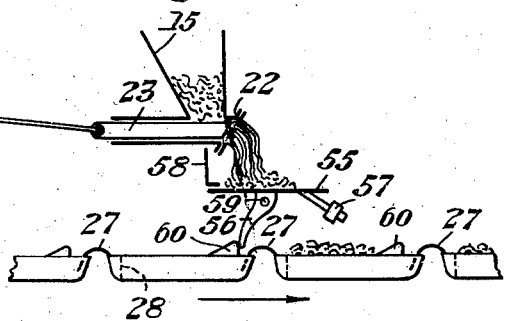
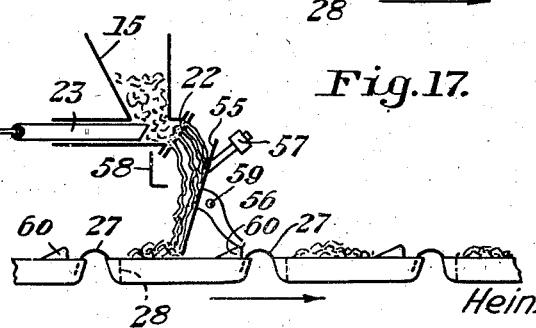
INVENTOR
Heinz Henry Chesny

UNITED STATES PATENT OFFICE 2,426,296

APPARATUS FOR REMOVING SOLUBLE IMPURITIES FROM SOLID SUBSTANCES

Heinz Henry Chesny, Worksop, England

Original application August 4, 1938, Serial No. 223,133, now Patent No. 2,231,154, dated February 11, 1941. Divided and this application December 10, 1940, Serial No. 369,444. In Great Britain August 19, 1937

9 Claims. (Cl. 23—270)

The present invention relates to the removal of soluble impurities from solid substances and, more particularly, to apparatus for the removal of impurities from solid substances such as magnesium hydroxide which can be formed, while still wet from previous process steps, into pieces of definite shape. The present application is a division of my copending application Ser. No. 223,-133, filed August 4, 1938, which has now eventuated into Patent No. 2,231,154.

In the aforesaid parent application I have described and claimed a method of removing soluble impurities from solids in the form of small masses in which the small masses are supported on a moving conveyor and moved in one direction while a solvent for the impurities contained in the small masses is caused to flow along the conveyor in contact with the masses and in a direction opposite the direction of movement of the masses. The present invention provides apparatus which may be used in the carrying out of the method described and claimed in said application and will be so described herein. However, it will be understood that while my invention is especially applicable to the removal of soluble impurities from small, self-supporting masses of magnesium hydroxide it may be used for various other similar purposes.

The invention may be applied with advantage to compact solid masses in the form of small rods, pellets or cakes, and in particular to precipitates which, if necessary, have been concentrated, e. g., by filtration or evaporation or both, so as to form a plastic material which can be moulded readily into compact masses. A concentrated sludge of a precipitate may be formed into small pieces by extrusion through perforated plates or by a process of moulding so as to expose a large surface area. Alternatively, the sludge may first be extruded and the extruded product may then be hardened by drying, for example, with hot air or steam.

The precipitate may conveniently be extruded through plates having perforations preferably 0.08 inch in diameter and spaced by about 0.1 inch between centres. This forms rods 0.08 inch in diameter and of varying lengths, the lengths depending upon the method of forcing the material through the plates. Although the rods may stick together longitudinally upon leaving the plate they subsequently separate when treated with the solvent.

The invention may be employed with particular advantage in the washing of a precipitate of magnesium hydroxide which has been concentrated to contain 30% to 48% $Mg(OH)_2$ and formed into rods, pellets or cakes. The washing process may be carried out at room temperature or at elevated temperatures. It has been found that water at temperatures between 25° C. and 50° C. constitutes a good solvent for the impurities contained in the magnesium hydroxide. The layer of magnesium hydroxide rods, pellets or cakes may conveniently be ¾ inch to 2 inches thick.

The formation of the small masses of solid from a precipitate in the form of a sludge may conveniently be carried out by heating the concentrated sludge in moulds for example in serrations formed in the periphery of a drum.

The conveyor may be either horizontal or slightly inclined. The inclination of the conveyor may range between 1 in 15 and 1 in 30 in order to permit the downward flow of solvent at a suitable rate when the solvent flow is by gravity. When water is employed as the solvent its downward flow may vary between 2 to 8 gallons per minute per foot width of conveyor. Alternatively the rate of flow of the washing water down the conveyor may be between 4 and 16 feet per minute.

In the case of magnesium hydroxide rods, pellets or cakes containing 30% solids, it has been found that a suitable downward velocity of solvent is 7 feet per minute. When the downward velocity exceeds 12 feet per minute a certain amount of breaking up of the caked masses occurs unless the concentration of the solid is increased.

When the solid is in the form of rods, these may conveniently have a diameter between 0.04 inch and 0.12 inch.

The conveyor may conveniently be provided with a belt having upstanding side walls made for example of soft rubber and trapesium-shaped in cross-section in order to prevent the bending over of the side walls while the belt is passing around the end pulleys. Transverse partitions, made for example of wire gauze, may be arranged between the side walls of the conveyor belt. Alternatively the solid may be carried in a series of pans secured to the conveyor, the lower end of each pan being provided with a lip which overlaps the top edge of the pan next below it in series. The side and top walls of the pans are preferably of the same height and are higher than the lower end wall of the pan. They may conveniently be attached to roller chains and may be provided with wire screens near the lower end to facilitate the drainage of liquid from the solid.

The screens may be of 0.06 inch to 0.13 inch mesh. This arrangement of apparatus can be used with solvents which would attack the rubber of a conveyor belt and has the advantage of retaining solvent in contact with the solid for a longer period. It has the further advantage that it permits of a greater submergence of the solid and a more efficient redistribution of the solvent at the entry to each pan, thus minimizing or preventing solvent from running through the solid in channels. The distribution of solvent may be further improved by the provision of a splash plate at the upper end of each pan upon which the liquid leaving the adjacent pan in the series flows.

When the solid possesses sufficient mechanical strength the velocity of the solvent may be increased in the pan type of apparatus to produce a swirling motion of the solid within the pans, thus further increasing the efficiency of extraction of impurities.

At the upper end of the conveyor the residual solvent may be removed from the solid by depositing the wet solid on a draining conveyor which may be inclined at a relatively steep angle. This draining conveyor may be provided with ribs or screens arranged e. g. diagonally across the surface of the conveyor in order to retain the solid on the conveyor. The draining conveyor may consist of a rubber belt or of a series of flat metal trays which may be grooved so as to facilitate the removal of solvent from the solid. Scraper knives may be used to remove the solid from the draining conveyor.

The apparatus may consist of several conveyors in series with a draining belt arranged between successive conveyors of the series.

The apparatus further includes means for forming a paste of the material to be washed into small rod-like masses by extruding the paste through a perforated plate. The extrusion apparatus may conveniently be mounted over the lower end of the conveyor and the extrusion plate is preferably inclined to the horizontal so as to facilitate the separation of the rods from the plate.

In the accompanying drawings I have shown for purposes of illustration only a preferred embodiment and several modifications of my invention. In the drawings:

Figure 1 is a side elevation of a washing and draining conveyor with its associated feed apparatus;

Figure 2 is a plan view of the washing and draining conveyor shown in Figure 1;

Figure 3 is a side elevation partly in section of one form of extrusion press;

Figure 4 is a front view of the end of the extrusion press shown in Figure 3;

Figure 5 is a plan view of the extrusion press;

Figure 6 is a plan view on a larger scale of one of the pans of the conveyor shown in Figures 1 and 2;

Figure 7 is a side elevation partly in section and on an enlarged scale taken on the line 7—7 of Figure 6 looking in the direction of the arrows;

Figure 8 is a perspective view of an alternative form of conveyor;

Figure 9 represents in purely diagrammatic form the concentration of the precipitate by filtration using a rotary suction roll dipping into a trough of the precipitate, the dried material being scraped off the roll towards the end of each revolution;

Figure 10 illustrates the partial drying of the precipitate by hot air or steam which is admitted at the bottom of a chamber as shown and is withdrawn from the top while the precipitate passes downwardly through the chamber on a series of conveyors;

Figure 11 is a side view illustrating the formation of small masses of a precipitate by feeding the precipitate while wet from a hopper 36 into circumferential grooves 37 on the periphery of steam-heated drum 38 rotated in the direction of the arrow, the precipitate being pressed into the grooves by the roller 39 and the partially dried solid removed by a scraper 40;

Figure 12 is an elevation of the roller shown in Figure 11;

Figure 13 shows in diagrammatic form an arrangement in which conveyors 41, 42 and 43 are employed in conjunction with draining conveyors 44, 45 and 46;

Figure 14 shows a portion of a belt for a draining conveyor which is provided with upstanding ribs 48;

Figure 15 is a section on the line A—A' in Figure 14; and

Figures 16 and 17 show two positions of one form of device for preventing the extruded material from falling on to the transverse screens of the conveyor or from entering the space between the screen and the lower lip of the pans.

Referring to Figures 1, 2, 6, 7 and 8, a conveyor 11 is provided which is inclined to the horizontal. 12 are pans or compartments on the conveyor. 13 and 14 are the end rollers of the conveyor. 15 is a hopper for the material to be treated and 16 is a device for forming the material into rods, pellets or cakes. 17 is a pipe for distributing a stream of solvent upon the conveyor, 18 is a draining conveyor running around end pulleys 19 and 20, and 21 is a hopper to receive the washed and drained material.

Referring to Figures 3, 4 and 5, 22 is an extrusion plate for forming a paste into rods and 23 is a plunger driven by a crank 24 for forcing the paste through the plate.

Referring to Figures 6 and 7, 25 are pens secured to the conveyor, 26 are vertical partitions dividing the pans into compartments, 27 is a lip at the lower end of each pan overlapping the upper end of the pan next below it in the series, and 28 is a wire gauze screen near the lower end of each pan. The pans are supported on chains 29.

In Figure 8 a conveyor belt 30 is provided with upstanding side walls 31 and transverse wire screens 32.

The device shown in Figures 16 and 17 consists of a pivoted shield plate 55 which shields the screen 28 or the space between the screen 28 and the lower lip 27 of a pan while beneath the extrusion apparatus. The shield 55 is provided with a lever 56 which engages with cams 60 attached to the pans. A fixed stop-plate 58 and a counterweight 57 are provided to maintain the shield 55 in a normally horizontal position. When the open portion of a pan is located centrally below the shield, the cam 60 engages the lever thereby tilting the shield 55 into the position shown in Figure 17 and thus dumping the extruded rods which have collected on the shield into the pan.

*Example I*

Crystalline precipitated magnesium hydroxide may be washed in accordance with the present invention by concentrating the slurry originally containing 12% of magnesium hydroxide as the solid phase together with dissolved alkali and alkali earth chlorides and sulphates in the liquid phase, the chlorides expressed as NaCl amounting to 3.9%, to form a sludge containing 33.7% Mg(OH)$_2$ and 2.45% NaCl, i. e. 6.8% NaCl calculated on the dry basis. The sludge was formed into small rods by extrusion in extrusion apparatus shown in Figures 3, 4 and 5 of the drawing, the sludge being fed from the feed hopper 15 into the compression chamber where it is forced by the plunger 23 through the inclined extrusion plate 22. The inclination of the extrusion plate and the corresponding inclination of the plunger 23 assist the passage of the sludge into the compression chamber and the removal of the extruded rods from the plate.

The extruded material is deposited directly into the series of pans 25 to form a layer ¾ inch to 1¾ inches in thickness secured to a pair of roller chains 29 (Figure 7).

Water at a temperature of about 30° C. is flowed into the pans at the upper end of the belt 11 through the distributing pipe 17 and flows from pan to pan down the conveyor. The amount of water is between 0.3 and 1 cubic foot per minute per foot width of the pans and this produces (with a conveyor rising 1 foot in 20 feet) a flow of water down the conveyor at a rate of about 7 feet per minute. Even distribution of the water entering a pan may be ensured by means of splash plates 33 (see Figure 7). At the upper end of the conveyor the washed solid is deposited on a drying conveyor 18 which is inclined at a greater angle than the conveyor 11. The drained solid is finally deposited in the hopper 21.

During the dumping of the washed solid onto the conveyor 18 from the upper pan 25 as it passes around the upper roller or pulley 14 of the conveyor, the water in the pan passes through the slit, over the leading end of the pan and under the lip 27 on the trailing end of the pan in advance thereof and is discharged laterally from between the two pans, while the solids pass over the lip 27 onto the conveyor 18.

*Example II*

In an alternative method of washing crystalline precipitated magnesium hydroxide of the composition described in Example I, the crystalline magnesium hydroxide sludge containing between 32% and 48% solids is extruded through a plate having holes 0.08 inch in diameter on to the lower end of a conveyor belt 30 (Figure 8) moving in an upward direction and rising 1 foot in 20 feet, the rate of extrusion being such as to give a layer 1¼ to 1¾ inches in thickness. The belt 30, which is 1 foot wide and consists of a canvas inserted rubber belt, is provided with vulcanised sides 31, 2 inches to 4 inches in height, the sides being broader at the base than at the top, and is sprayed towards its upper end with softened water at a temperature of 40° C. at a rate of 4.5 gallons per minute. This produces a flow of water down the belt at a rate of about 7 feet per minute.

In order to check any tendency for material to be washed towards the bottom of the belt by the flow of water transverse wire gauze screens 32 having a mesh of 1/16 to 1/8 inch are provided at intervals of 2 feet.

The belt is carried by two chains (not shown) carrying angle bars at suitable intervals to which the belt is attached. Suitable driving sprockets are provided at one or both of the ends of the conveyor.

Treatment of the extruded mass with water by the method and with the apparatus described above resulted in the reduction in the proportion of sodium chloride to 1.6% after 10 minutes' washing, to 0.4% after 30 minutes' washing, to 0.2% after 60 minutes' washing and to 0.1% after 120 minutes' washing.

I claim:

1. Apparatus for removing impurities from finely divided solids capable of being formed into small masses by means of a liquid, which comprises a slightly inclined conveyor embodying a plurality of pans having water-tight sides, ends and bottoms, the lower end of each pan being provided with a lip which overhangs the top edge of the pan next below it in the series to direct the liquid from an upper pan to the next pan below it, means adjacent the lower end of each of said pans for preventing the washing of solids from one pan to another, means for forming said solids into small masses and for loading the pans at the lower end of the conveyor with said small masses, means for driving the conveyor so that its upper surface travels in an upward direction, and means for admitting a liquid to the pans towards the upper end of the conveyor.

2. Apparatus for removing soluble impurities from finely divided solids capable of being formed into small masses which comprises a slightly inclined conveyor embodying a series of pans, the lower end of each pan being provided with a lip which overhangs the top edge of the pan next below it in the series, a reticular member adjacent the lower end of each pan, means for forming the solids into small masses and for loading the pans at the lower end of the conveyor with the said small masses, means for moving the conveyor so that its upper surface travels in an upward direction and means for admitting to the pans at the upper end of the conveyor controlled amounts of the solvent for the said impurities.

3. Apparatus for removing impurities from finely divided solids capable of being formed into small masses which comprises a conveyor slightly inclined to the horizontal along its length, means for forming the solids into small masses and for loading the conveyor at its lower end with said small masses, means for moving the conveyor so that its upper surface travels in an upward direction, means for admitting a liquid to the conveyor towards its upper end, and a draining conveyor adjacent the upper end of said first-mentioned conveyor arranged to receive material discharged therefrom and provided with diagonal ribs or screens to retain the washed masses of solid.

4. Apparatus for removing impurities from finely divided solids capable of being formed into small masses which comprises a conveyor slightly inclined to the horizontal along its length, means for forming the solids into small masses and for loading the conveyor at its lower end with said small masses, means for moving the conveyor so that its upper surface moves in an upward direction, means for admitting a liquid to the conveyor towards its upper end, and a draining conveyor adjacent the upper end of said first-mentioned conveyor arranged to receive material discharged therefrom and having a grooved surface to facilitate the removal of liquid from the washed solid.

5. Apparatus for removing impurities from finely divided solids capable of being formed into small masses which comprises a conveyor slightly inclined to the horizontal along its length, a press adapted to extrude a paste of the material to be washed in the form of rods and to deposit the said rods on the conveyor, means for moving the conveyor so that its upper surface travels in an upward direction, and means for admitting a washing liquid to the conveyor towards its upper end, and means adjacent the upper end of the conveyor for receiving solids discharged therefrom.

6. Apparatus for removing soluble impurities from finely divided solids capable of being formed into small masses which comprises a conveyor slightly inclined to the horizontal along its length, a press for extruding a paste of the material to be washed into rods, an extrusion plate inclined to the horizontal to facilitate the separation of the extruded rods from the plate, means for loading the conveyor at its lower end with the said extruded rods of the solid to be treated for the removal of soluble impurities therefrom, means for moving the conveyor so that its upper surface travels in an upward direction, and means for admitting to the conveyor towards its upper end solvent for the said impurities.

7. Apparatus for removing soluble impurities from finely divided solids capable of being formed into small masses which comprises a conveyor slightly inclined to the horizontal along its length and embodying pans with a screen across the lower end of each pan, means for loading the conveyor comprising a press for extruding a paste of the material to be washed into rods and having an outlet for the rods located above the lower end of the conveyor, means for preventing the deposition of extruded solid upon the transverse screens of the conveyor and in the space between the screen and the lip of each pan comprising a shield adapted to receive the rods from the outlet of the press, means for dumping the rods collected on the shield into the pan, means for moving the conveyor continuously so that the upper surface travels in an upward direction and means for allowing controlled amounts of solvent for the said impurities to flow down the conveyor.

8. Apparatus for removing soluble impurities from finely divided solids capable of being formed into small masses which comprises a conveyor slightly inclined to the horizontal along its length and divided into compartments along its length, the lower end of each compartment terminating in a lip which overhangs the next compartment below it, a press for extruding a paste of the material to be washed, means for preventing extruded material from being deposited upon the lip of each compartment, means for moving the conveyor so that the upper surface travels in an upward direction, and means for admitting to the conveyor toward its upper end solvent for the impurities.

9. Apparatus for removing soluble impurities from finely divided solids capable of being formed into small masses which comprises a conveyor slightly inclined to the horizontal along its length and divided into pans, a press for extruding a paste of the material to be washed into rods and having an outlet for the rods located above the lower end of the conveyor, a shield adjacent the press for preventing the deposition of extruded solid upon the lip at the lower end of each pan, means for dumping the rods collected on the shield into the pan, means for moving the conveyor continuously so that the upper surface travels in an upward direction, and means for allowing controlled amounts of solvent for the said impurities to flow down the conveyor.

HEINZ HENRY CHESNY.

REFERENCES CITED

The following references are of record in the file of this patent:

UNITED STATES PATENTS

| Number | Name | Date |
|---|---|---|
| 550,033 | Wheeler | Nov. 19, 1895 |
| 2,214,925 | Guthrie | Sept. 17, 1940 |
| 550,035 | Wheeler | Nov. 19, 1895 |
| 496,866 | Craney | May 9, 1893 |
| 2,099,379 | Spellacy | Nov. 16, 1937 |
| 1,870,613 | Du Pont | Aug. 9, 1938 |
| 2,010,207 | Topham | Aug. 6, 1935 |
| 1,748,868 | Dethloff | Feb. 25, 1930 |
| 1,545,257 | Hopkinson | July 7, 1925 |
| 2,231,154 | Chesny | Feb. 11, 1941 |
| 2,190,136 | Oberg | Feb. 13, 1940 |

FOREIGN PATENTS

| Number | Country | Date |
|---|---|---|
| 329,030 | Great Britain | May 15, 1930 |
| 17,987 | Great Britain | 1914 |
| 4,687 | Great Britain | 1914 |